United States Patent
Auch et al.

(10) Patent No.: US 10,671,572 B2
(45) Date of Patent: Jun. 2, 2020

(54) STORAGE OF LOG-STRUCTURED DATA

(71) Applicant: SAP SE, Walldorf (DE)

(72) Inventors: Nathan Auch, Waterloo (CA); Scott MacLean, Waterloo (CA); Peter Bumbulis, Cambridge (CA); Jeffrey Pound, Kitchener (CA); Anil Kumar Goel, Waterloo (DE)

(73) Assignee: SAP SE, Walldorf (DE)

( * ) Notice: Subject to any disclaimer, the term of this patent is extended or adjusted under 35 U.S.C. 154(b) by 992 days.

(21) Appl. No.: 15/182,030

(22) Filed: Jun. 14, 2016

(65) Prior Publication Data

US 2017/0357667 A1    Dec. 14, 2017

(51) Int. Cl.
*G06F 16/18*  (2019.01)
*G06F 11/14*  (2006.01)
*G06F 16/17*  (2019.01)
*G06F 16/23*  (2019.01)

(52) U.S. Cl.
CPC .......... *G06F 16/1865* (2019.01); *G06F 11/14* (2013.01); *G06F 16/1734* (2019.01); *G06F 16/1805* (2019.01); *G06F 16/2358* (2019.01)

(58) Field of Classification Search
CPC ....... G06F 16/27; G06F 16/2358; G06F 3/065
See application file for complete search history.

(56) References Cited

U.S. PATENT DOCUMENTS

| 8,930,648 | B1 * | 1/2015 | Storer | G06F 12/0292 |
| | | | | 711/154 |
| 2004/0019681 | A1 * | 1/2004 | Nakamura | H04L 29/06 |
| | | | | 709/226 |
| 2009/0222544 | A1 * | 9/2009 | Xiao | H04L 41/147 |
| | | | | 709/223 |
| 2012/0166407 | A1 * | 6/2012 | Lee | G06F 16/2365 |
| | | | | 707/703 |
| 2012/0198174 | A1 * | 8/2012 | Nellans | G06F 12/0804 |
| | | | | 711/133 |
| 2013/0084063 | A1 * | 4/2013 | Hu | H04L 49/10 |
| | | | | 398/2 |

(Continued)

OTHER PUBLICATIONS

Goel, Anil K. et al. "Towards Scalable Realtime Analytics: An Architecture for Scaleout of OLxP Workloads", Proceedings of the VLDB Endowment, vol. 8, No. 12, 2015, (pp. 1716-1727, 12 total pages).

*Primary Examiner* — Mohammad S Rostami
(74) *Attorney, Agent, or Firm* — Buckley, Maschoff & Talwalkar LLC

(57) ABSTRACT

A system includes reception of a first write request from a client including a first key and a first one or more stream, payload pairs associated with the first key, copying of the first key and the first one or more stream, payload pairs to a first buffer of a volatile memory, storage of data of the first buffer in one or more blocks of a raw block non-volatile memory device, providing of the first buffer to a stream store server, reception of the first buffer at the stream store server, adding of the first key and the first one or more stream, payload pairs to a second buffer of the volatile memory, in key-order, storage of the data of the second buffer in a filesystem storage device, according to stream, and transmission of an indication of the durability of the key to the tail store server.

18 Claims, 8 Drawing Sheets

(56) References Cited

U.S. PATENT DOCUMENTS

| | | | |
|---|---|---|---|
| 2013/0166855 A1* | 6/2013 | Batwara | G06F 3/0608 |
| | | | 711/154 |
| 2014/0149357 A1* | 5/2014 | Gupta | G06F 11/1446 |
| | | | 707/652 |
| 2015/0379100 A1* | 12/2015 | Vermeulen | G06F 16/27 |
| | | | 707/620 |
| 2016/0085480 A1* | 3/2016 | Chiu | G06F 3/0647 |
| | | | 711/117 |
| 2017/0109058 A1* | 4/2017 | Shallal | G06F 3/0611 |

\* cited by examiner

STORAGE OF LOG-STRUCTURED DATA

BACKGROUND

Enterprise database systems store data related to many aspects of a business enterprise. Every transaction (where "transaction" refers to a set of operations) against the data stored in database causes a log record to be written into a transaction log. The log record typically describes the transaction and its effect on the data. The log records of the transaction log may therefore be used to recover from errors or to restore the database to a prior state.

It is desirable to design a durable log data storage system that supports low-latency writes and high throughput reads, or scans. Such a storage system may prevent data from being written to a particular memory index, or key, more than once, and guarantee that a value for a key is durable once acknowledged as written (e.g., even in the event of failures such as power loss). A value for a key may include multiple payloads, where each payload is associated with a "stream" identifier. In such a case, scanning for the key and specifying a stream identifier causes the storage system to return an individual payload of a value which is associated with the stream identifier.

DETAILED DESCRIPTION

The following description is provided to enable any person in the art to make and use the described embodiments. Various modifications, however, will remain readily apparent to those in the art.

According to some embodiments, log data is stored using two different data stores. Low-latency write operations are implemented by a "tail store" which receives key/stream/value payloads, ensures that write-once semantics are enforced and persists the payloads directly to a raw block device managed by the tail store (i.e., without using a filesystem). High-throughput scan operations are supported by a "stream store" which stores ranges of a stream, sorted by key, in regular operating system files. Efficient scans are supported since all data in the stream store is separated by stream and the data is in sorted order on disk. The use of the filesystem by the stream store allows the use of zero-copy network transfers to further reduce the CPU-load of scan operations. Log data is moved synchronously from the tail store to the stream store to allow acknowledgement of a write request as durable and thereby make the log data visible to scanners. The log data is persisted to disk by the stream store asynchronously.

Figure 1:
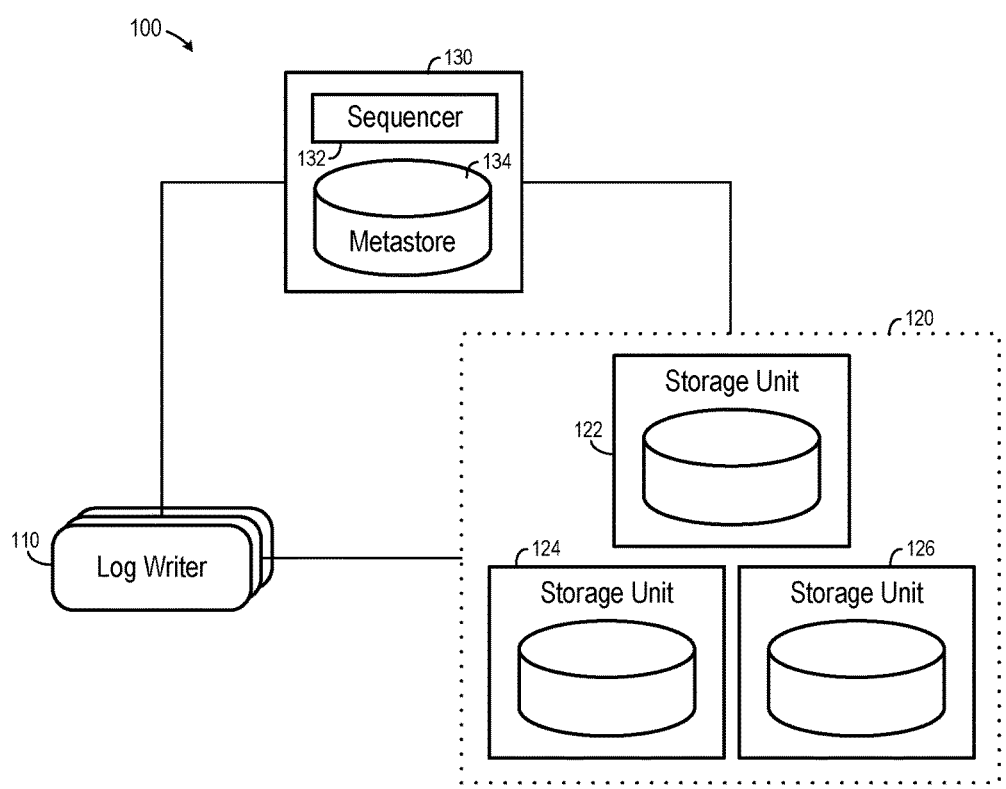
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes log writers 110, storage cluster 120 and management host 130. The elements of architecture 100 may operate to provide storage and replication of log data according to some embodiments.

Storage cluster 120 comprises three storage units 122, 124 and 126, but embodiments are not limited thereto. Each storage unit of storage cluster 120 is intended to store a replica of a particular data set, thereby providing fault-tolerance. Storage cluster 120 comprises one primary storage unit and one or more secondary storage units. According to some embodiments, the primary storage unit receives write requests and manages replication of the writes within the secondary storage units. Some embodiments may employ only one storage unit, in which case replication is not supported.

In some embodiments, the log data may be stored in storage units 122, 124 and 126 as one or more of conventional tabular data, row-based data, column-based data, and object-based data. Moreover, the data may be indexed and/or selectively replicated in an index to allow fast searching and retrieval thereof. Storage cluster 120 may support multi-tenancy to separately support multiple logical database systems by providing multiple logs which are programmatically isolated from one another.

Each of log writers 110 may comprise one or more computing devices executing software applications to request the writing of log data to storage cluster 120. The software may comprise one or more database applications. A log writer 110 may comprise a distributed node of a database management system according to some embodiments. Such a node may comprise one or more processors, memory and software which is executable to perform database management functions.

Management host 130 includes sequencer 132 and metastore 134. Sequencer 132 and metastore 134 need not be located on the same host in some embodiments. Metastore 134 may comprise a separate distributed system, and sequencer 132 may execute on any host, including one of storage units 122, 124 and 126.

Sequencer 132 issues a monotonically-increasing log sequence number (LSN) to a log writer 110 upon request. Log writers 110 use such LSNs as keys when requesting writes of key-value pairs to storage cluster 120.

More specifically, the log data generated by log writers 110 may be organized into logically-disjoint entities called streams. Streams are defined by the software application and the log data may support an unbounded number of streams. A write to a storage unit is identified by an LSN. When a log writer 110 issues a request to write data to the log, it provides an LSN and a set of <stream, payload> pairs. The write is atomic, in that either all streams are modified or none are modified. Any given LSN can only be written only once. Therefore, once a write to a particular LSN is acknowledged to a client by a storage unit, the storage unit will return an error in response to any subsequent requests to write to the particular LSN.

Figure 2:
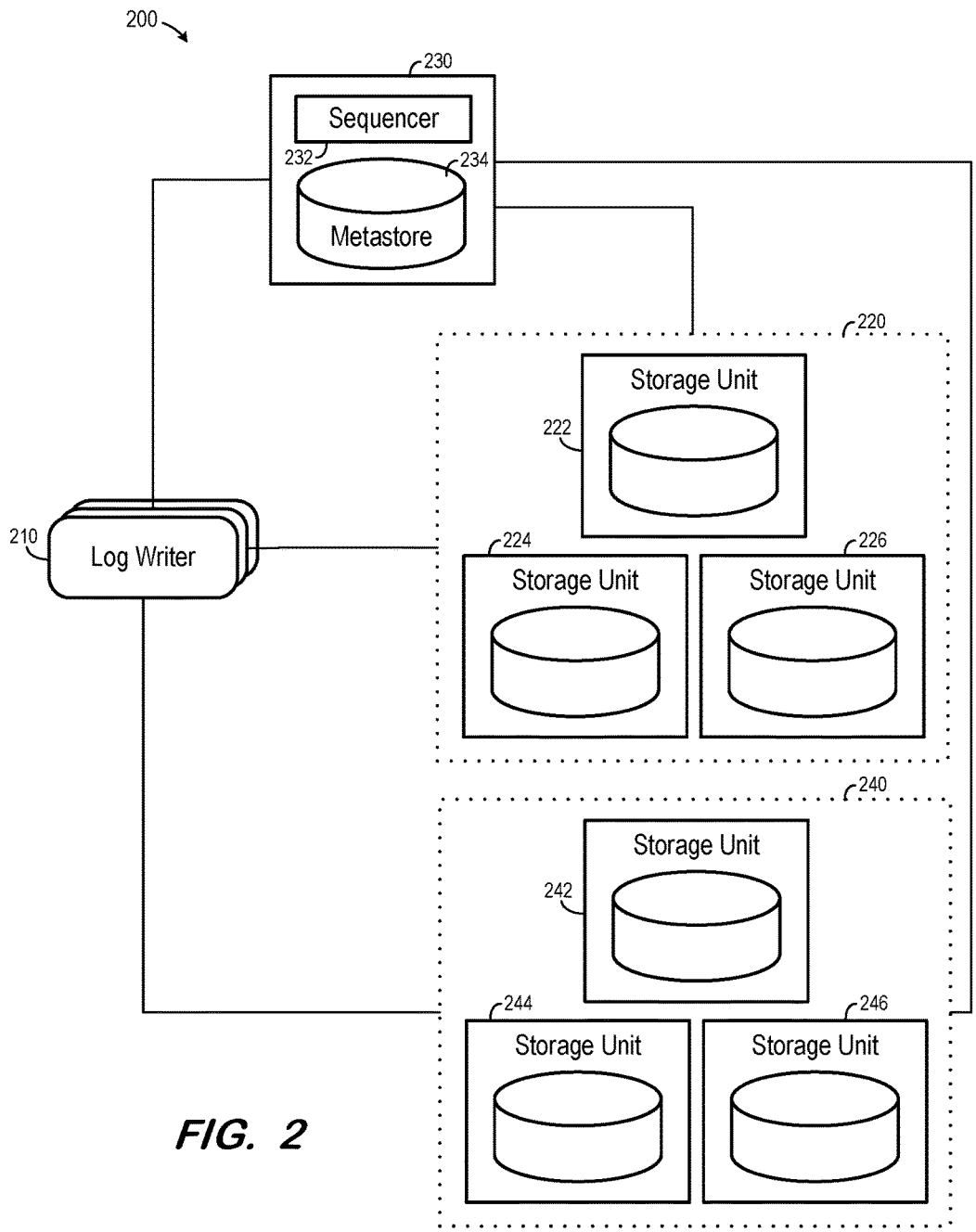
FIG. 2 is a block diagram of a system architecture according to some embodiments.

Metastore 134 may store a directory of available storage units as well as storage cluster configuration information. Metastore 134 may also store mappings between log fragments and storage clusters. Such mappings support striping, in which one storage cluster stores log fragments of one stripe (e.g., all streams for a particular subset of LSNs) of the overall log data, and other storage clusters store log fragments of other stripes of the overall log data. Architecture 200 of FIG. 2 illustrates a system which supports striping.

More particularly, the components of architecture 200 may be implemented as described above with respect to similarly-numbered components of architecture 100. However, it is assumed that storage cluster 220 stores log fragments of a first stripe of the overall log data, and storage cluster 240 stores log fragments of a second stripe of the overall log data. Metastore 234 maintains the stripe/cluster associations and provides these associations to log writers 210 (or to an intermediate multiplexing component) so that write requests for particular log fragments may be directed to an appropriate cluster. The log data may be partitioned into more than two stripes in some embodiments, with a respective storage cluster (or clusters) assigned to store log fragments of each stripe.

Figure 3:
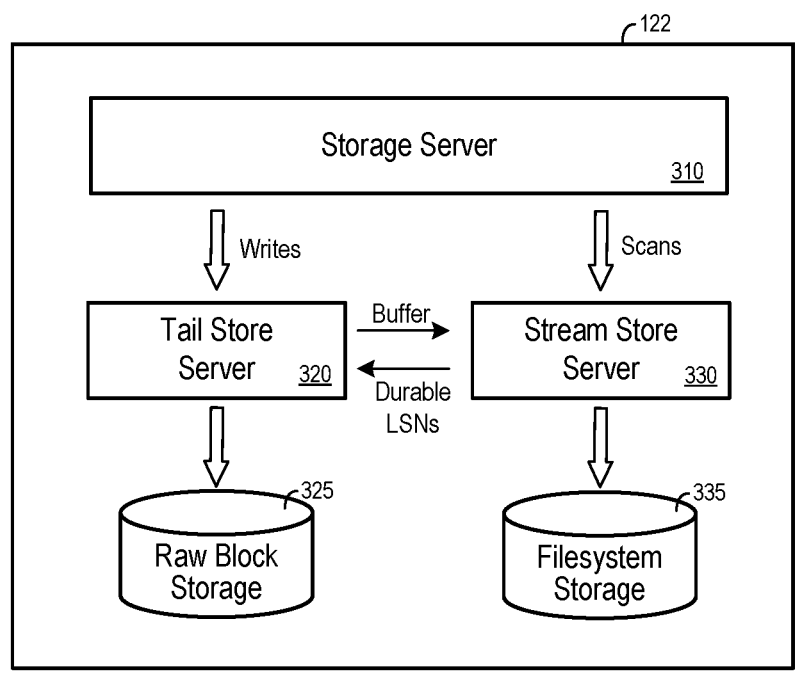
FIG. 3 is a block diagram of a storage unit according to some embodiments.

FIG. 3 is a block diagram of a storage unit according to some embodiments. Each of storage server 310, tail store server 320 and stream store server 330 may be implemented using an asynchronous paradigm in which requests are issued and notification is provided when the requests complete. Such an implementation may support handling of a large number of requests without requiring a large number of threads. Each of storage server 310, tail store server 320 and stream store server 330 may be embodied in processor-executable program code executed by one or more processors of storage unit 122.

Storage server 310 receives write requests from clients and manages data flow between tail store server 320 and stream store server 330. Storage server 310 may be implemented as a thread pool in which each thread pulls requests from the network. Tail store server 320 persists data in raw block memory device 325, which may comprise a solid-state no-volatile memory or any other suitable memory device capable of storing raw block data (i.e., bypassing the OS/filesystem). Tail store server 320 may, in some embodiments, persist data in a standard OS/filesystem file. Stream store server 330 stores data in filesystem storage 335 in a stream-wise fashion to support efficient scans over sets of streams.

Figure 4:
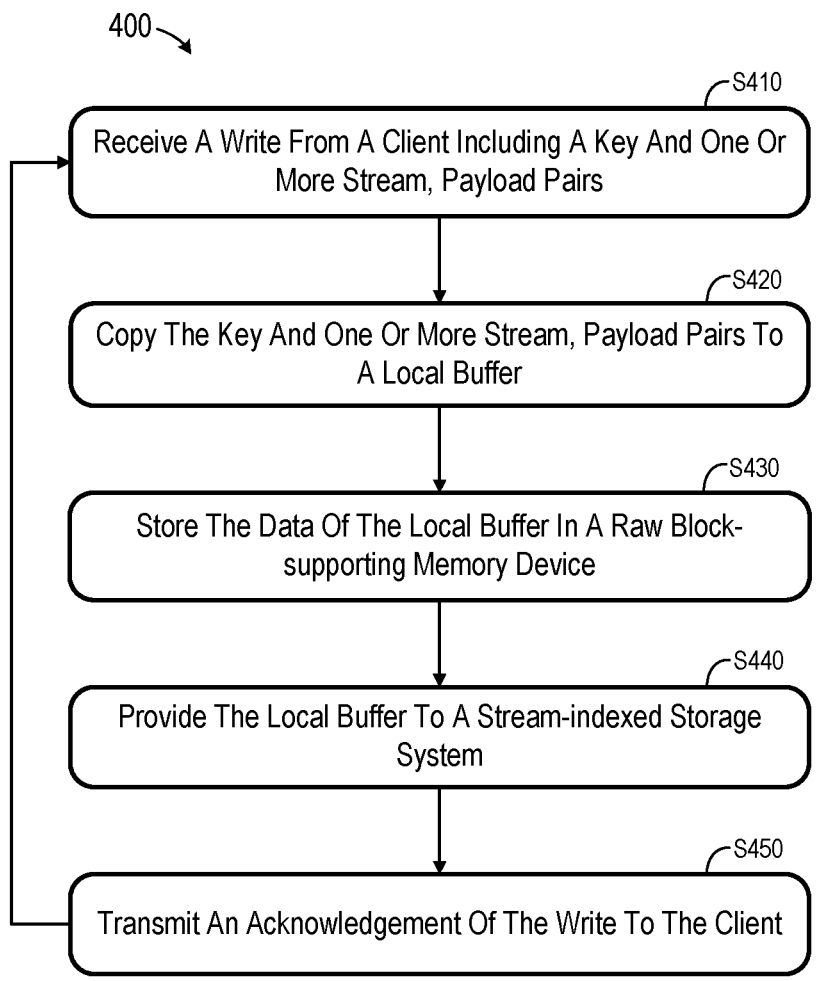
FIG. 4 is a flow diagram of a process according to some embodiments.

FIG. 4 comprises a flow diagram of process 400 according to some embodiments. In some embodiments, various hardware elements of a storage unit execute program code to perform process 400. Processes 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, a write request is received from a client. The write request includes a key (e.g., an LSN) and one or more stream, payload pairs. The request may be received from a log writer such as log writer 110 of architecture 100. According to some embodiments, the log writer 110 requests an LSN from sequencer 132 of management host 130 for use as the key of the write request. The log writer 110 may also receive, from management host 130, an identifier of the primary storage unit associated with the stripe to which the LSN belongs. The write request is received at S410 by the identified primary storage unit.

It will be assumed that the request is received by storage server 310 and then by tail store server 320 at S410. According to some embodiments, tail store server 320 stores, in volatile memory, metadata specifying the LSNs assigned to storage unit 122. If the received write request specifies an LSN that is not assigned to storage unit 122, the write request is rejected.

At S420, tail store server 320 copies the key and one or more stream, payload pairs to a local memory buffer of storage unit 122 (e.g., Random Access Memory). At this point, the one or more stream, payload pairs are not visible to potential scanners.

Figure 5:
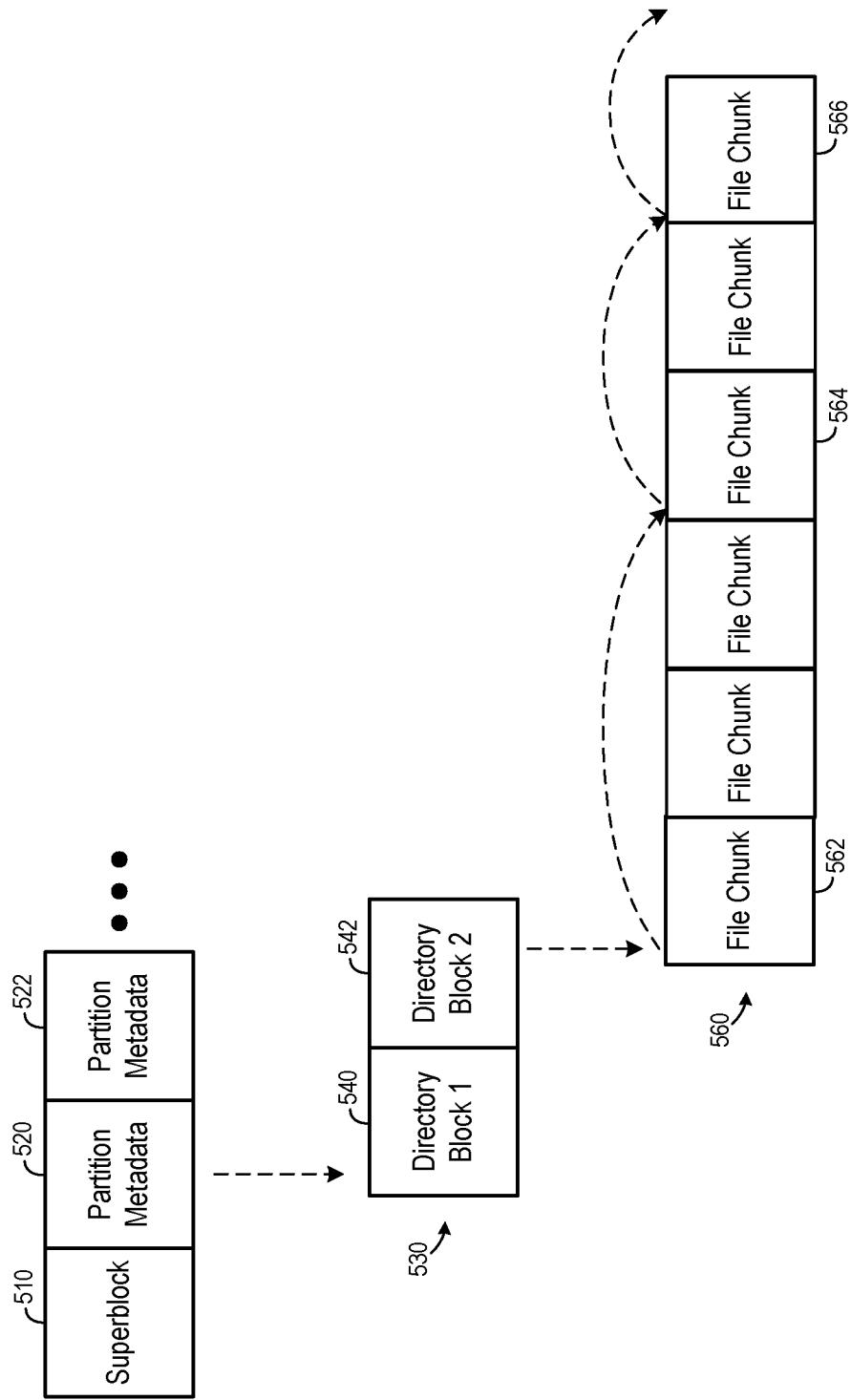
FIG. 5 illustrates memory blocks of a raw block device according to some embodiments.

Tail store server 320 stores the data of the local memory buffer in raw block-supporting memory device 325 at S430. Such storage provides low-latency according to some embodiments. FIG. 5 illustrates several abstractions which are used in some embodiments to organize the data stored on a raw block device.

According to some embodiments, raw block device 325 is formatted based on a partition factor before writing any data thereto. The partition factor determines the degree of write-parallelism and may be selected according to the number of threads required to fully saturate the write bandwidth of raw block device 325. For some solid state raw block devices, a partition factor of 2 has been found sufficient.

As illustrated in FIG. 5, the first block of device 325 contains superblock 510. Superblock 510 may describes the partition map as follows:

| Field | Size (bits) | Description |
|---|---|---|
| BlockHeader | 40 | Block Header Structure |
| Magic Number | 32 | "DLOG" (big-endian) |
| FS Version | 32 | Persistency version |
| Store ID | 128 | UUID of the store |
| Block Size | 16 | Block size used to format the tail store |
| Partition Count | 8 | Number of Partition Metadata records that follow |

Partition metadata records 520 and 522 each correspond to a respective partition, and embodiments may support more than two partitions blocks. In some embodiments, the structure of each partition metadata record is:

| Field | Size (bits) | Description |
|---|---|---|
| Partition ID | 8 | The ID of the partition |
| Starting Block | 64 | The first block of the block device that belongs to the partition. |
| Size in Blocks | 64 | The number of blocks that make up this partition. |

As shown in FIG. 5, partition metadata record 520 points to the first block 540 of partition 530. Each partition holds several virtual files, and each virtual file which may hold a portion of the data of one logical log. The first two blocks of each partition are directory blocks (e.g., directory blocks 540, 542) which include a number of file metadata records to describe the files in the partition. As illustrated in the table below, each directory block reflects all the files in the partition. Updates to the two directory blocks are alternated to ensure that their state is not corrupted in case of power loss during a write to one of the directory blocks.

| Field | Size (bits) | Description |
| --- | --- | --- |
| Block Header | 40 | Block Header Structure |
| Version | 32 | The version of the directory block. On recovery, we always use the directory block that has the large version. The version field on the two directory blocks may only ever differ by one. |
| File Count | 8 | The number of File metadata structures that follow |

According to some embodiments, the structure of each file metadata record of a directory block is as follows:

| Field | Size (bits) | Description |
| --- | --- | --- |
| FileID | 32 | ID of the file |
| FirstPage | 64 | First page of the file (relative to the filesystem, not the partition) |
| Sequence | 32 | The sequence number that precedes the sequence number stored on the first page of the file |
| Record offset | 32 | The byte offset into the block where the header for the first record is found. |
| Generation | 32 | The number of times this file has been recovered. When a storage unit is shutdown uncleanly, it's possible that later blocks were written for a file without all the intermediate blocks being present. These blocks should be thrown away at recovery. The generation number allows us to treat these blocks as invalid/unwritten if they ever get linked into the file in the future. |

Accordingly, each file metadata record within a directory block points to a first page of a respective file. For example, a file metadata record within directory block 542 points to a first page of file 560. Each chunk (e.g., chunks 562, 564 and 566) of a file stored in the raw block device may include a header that contains the following information:

| Field | Size (bits) | Description |
| --- | --- | --- |
| BlockHeader | 20 | Block Header Structure |
| Data block Fixups | 600 | A BlockHeader sized area for every possible DATA block that makes up this chunk (max 15). To simplify implementation, data is memcpy'd into a MAX_CHUNK_SIZE contiguous buffer when storing records in a chunk. Before the buffer is actually written to disk, the BlockHeader areas in the DATA blocks are overwritten with a valid header (CRC + block type). The data that was in this location is copied to the Fixups area in the Chunk header. When a chunk is read from disk, the CRCs are verified and then the fixups are applied to the in memory image of the Chunk. |
| Next | 64 | First page of the next chunk |
| Sequence | 32 | Sequence number of this chunk |
| Generation | 32 | Generation number at which this chunk was written. |
| Byte Count | 32 | Number of bytes stored on this chunk. |
| CRC of CRCs | 32 | A CRC of the concatenation of the CRCs on all DATA blocks that make up this chunk. This allows us to detect a partially-written chunk. |
| File ID | 8 | The ID of the file to which this chunk belongs |

The chunks of a file such as file 560 are therefore variable-sized and linked together similarly to a linked list.

The file is self-describing in that the metadata describing which chunks belong to which file are stored within the file itself. Specifically, the header stores a pointer to the first page of the next chunks. Accordingly, storage at S430 requires only a single write to disk, in contrast to other approaches which require separate writes for data and for metadata describing the data.

The header of each chunks also contains a sequence number drawn from a 32-bit linear feedback shift register (LFSR) which indicates the chunks' logical position within the virtual file. The LFSR guarantees a full-period (32-bit), deterministic, pseudo-random sequence of sequence numbers. The correct sequence number for a next chunk can therefore be determined from the sequence number of the current chunk. In this regard, the end of the file may be located (e.g., during recovery) by determining where these sequence numbers don't match.

The data in a file such as file 560 is stored in variable-sized records. Conceptually, the chunks that make up a file constitute a byte stream, and the records are stored within this byte stream. Each record is stored as a header followed by an optional payload. The header for a record is as follows according to some embodiments:

| Field | Size (bits) | Description |
| --- | --- | --- |
| Operation | 8 | The type of operation being recorded. One of: OP_STORE (0) OP_FILL (1) OP_FORGET (2) |
| LSN | 64 | The LSN to which this operation applies (not always used) |
| Data Length | 64 | The length of the record that follows |

Returning to process 400, the data may be stored at S430 in raw block-supporting memory device 325 by serializing a record into the virtual byte stream, with the LSN of the write request being included in the record header as shown above and the stream, payload pairs composing the record and having a data length specified in the record header. A chunk may include more than one record or a record may span multiple chunks. Record headers may also be split across chunk boundaries.

After storage of the data at S430, the data of the local memory buffer is provided to a stream-indexed storage system (e.g., stream store server 330 and filesystem storage 335) at S440. The write is then acknowledged as durable to the client at S450. As a result of the acknowledgement, the write becomes available to scanners. According to some embodiments which provide data replication in secondary storage units as described above, S440 does not occur until successful replication of the write in the secondary storage units is confirmed.

The write to the stream-indexed storage system may comprise two phases according to some embodiments to further ensure that the write will be available to scanners. For example, in the first phase, sufficient free space to store the payload is reserved on the filesystem storage. This phase may be performed prior to S430 to reduce the risk of accepting a write that cannot be made visible to scanners. Then, after S430 (and any replication functionality), the second phase is to either commit or abort the write. In the commit case, the write is provided as described above and processed as will be described with respect to FIG. 6. In the abort case, the reserved free space is released.

Figure 6:
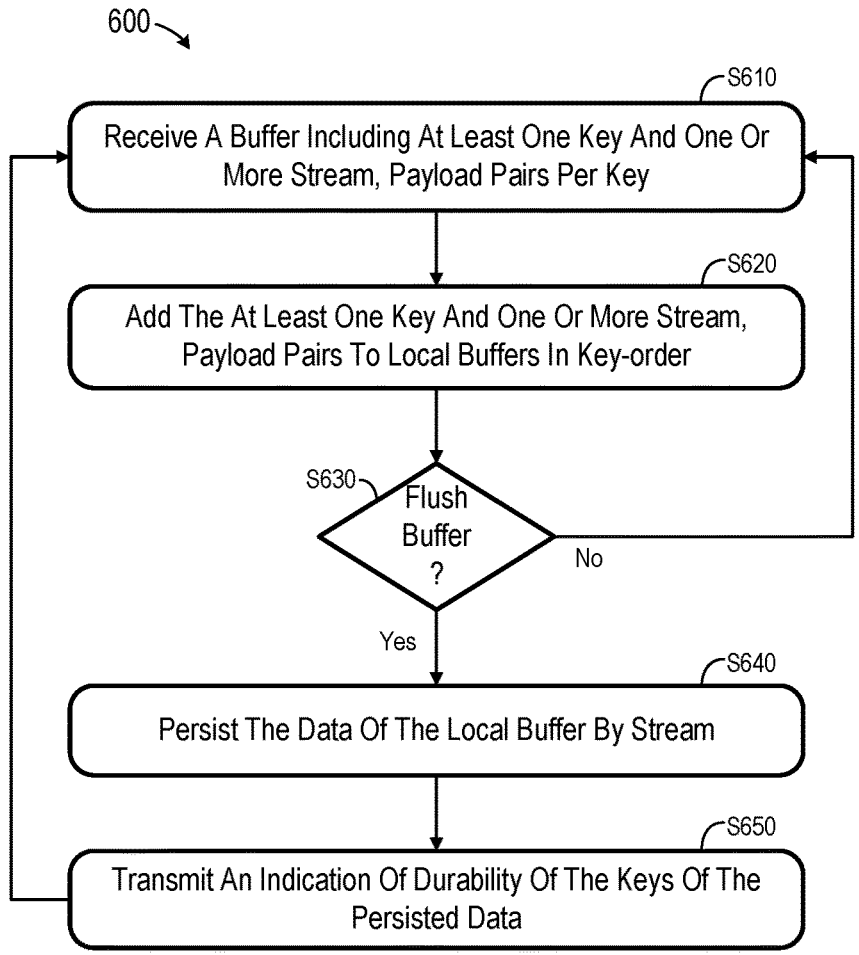
FIG. 6 is a flow diagram of a process according to some embodiments.

FIG. 6 is a flow diagram of process 600 which may be performed by stream store server 330 according to some embodiments. Initially, at S610, a memory buffer is received, for example, as provided by tail store server 320 at S440. The memory buffer includes at least one key and one or more stream, payload pairs per key. In this regard, the memory buffer may include data from more than one write request, which were received from the client either sequentially or in batch mode.

According to some embodiments, stream store server 330 splits the buffer into per-stream payloads, which are all eventually written to disk in stream segment files. Transferring data from the stream segment files to the network may utilize a zero-copy transfer operation.

The at least one key and associated stream, payload pairs per key are re-ordered by key (i.e., LSN) and buffered in memory at S620. Upon receipt of this data, stream store server 330 treats the (stream, payload) pairs individually. Each stream is associated with a dedicated buffer, and each payload is added to the buffer for the stream with which it was paired.

Next, at S630, it is determined whether to flush any of the buffers to disk. The determination may be based on whether data representing a consecutive sequence of LSNs has been received and stored in a buffer. At this point of the present example, only data associated with a single LSN has been received so flow returns to S610.

Another buffer is received at S610, and the data thereof (i.e., at least one key and one or more stream, payload pairs per key) is added to the local buffers at S620. The data is added at S620 so as to maintain the key-ordering within the local buffers. Flow continues as described above until the local buffer includes data associated with several LSNs.

Once the buffer reaches a predefined size or a predefined amount of total capacity, and/or after a predefined period of time since a last buffer flush, it is determined at S630 whether the buffer includes data associated with several consecutive LSNs. In this regard, data associated with LSNs 1 and 3 may be stored in the buffers before data associated with LSN 2 is stored in the buffers.

The check for a consecutive LSN sequence considers all of the keys written across all of the stream-specific buffers. For example, it will be assumed that stream store server 330 receives the following writes: LSN 0: (stream 1, payload A), LSN 2: (stream 2, payload B), LSN 1: (stream 3, payload C). Accordingly, after the data for LSN 1 has been buffered, the stream buffers for all three streams may be written to disk because stream store server 330 as a whole has received a consecutive prefix of the LSNs.

In response to an affirmative determination at S630, the payloads associated with each stream of each of the contiguous LSNs are persisted in the filesystem at S640. According to some embodiments, each stream is split into contiguous ranges called segments. Each segment contains the payloads and metadata for a single stream within a contiguous LSN range. A segment for a particular stream might not include every LSN in the range, but every LSN in the range is represented in some segment (i.e., in the segments of one or more other streams).

Figure 8:
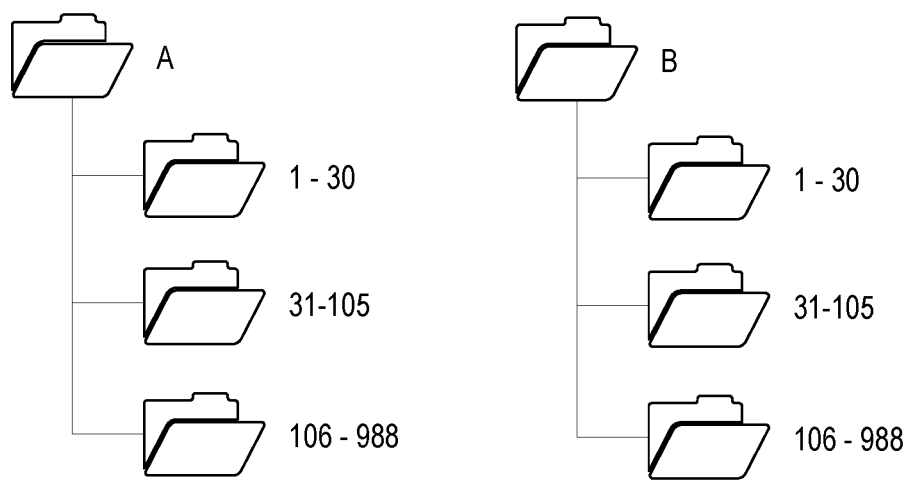
FIG. 8 illustrates folders stored within a filesystem according to some embodiments.

The segment files are stored in the file system hierarchy at S640 to facilitate lookup thereof. As illustrated in FIG. 8, one top level directory corresponds to each stream, and is named after the stream ID (i.e., streams "A" and "B"). Each sub-directory of a stream directory corresponds to a single segment stored at S640. The name of each sub-directory conforms to "<startlsn>-<endlsn>", thereby indicating the LSNs which comprise the segment stored within the sub-directory.

Each segment directory includes an index file and a data file, which together represent a single segment. The data file is the concatenation of the payloads for the individual LSNs, and the index file provides the location within the data file of a payload associated with an LSN. Both the index file and data file are stored in LSN-sorted order.

According to some embodiments, the index file includes a header and an array of EntryData structures. The header file includes:

| Field | Size (bits) | Description |
| --- | --- | --- |
| Version | 32 | Stream store persistence version format |
| CRC | 32 | Checksum of the index file |
| Count | 64 | Number of LSNs written to the segment |

Each of the EntryData structures includes the following:

| Field | Size (bits) | Description |
| --- | --- | --- |
| LSN | 64 | The LSN that this entry refers to |
| Offset | 64 | The offset into the data file at which the payload for the LSN begins |
| Writer ID | 64 | The unique ID of the LSNs writer |
| CRC | 32 | Checksum of the payload written to this stream |

Instead of managing a cache within the storage unit itself, some embodiments rely on the operating system page cache to handle caching of objects. Storing data in the page cache allows the use of kernel-level zero-copy facilities (e.g., sendfile) to transfer data back to clients, use all available memory on the machine, and keep data cache-resident in case of process crash or restart.

After persisting the data in filesystem storage 335, an indication of the durability of the writes to the keys of the persisted data is transmitted to tail store server 320 at S650. However, because each of the streams in a write request is persisted individually, the durability of a key is not transmitted to tail store server 320 until the key's data has been persisted to disk in each relevant stream.

Flow then returns to S610 to receive additional data. As described above, this data is held in-memory until a decision is made to flush the buffer at S630. Accordingly, at a given time during operation, some payload data which has been acknowledged to the client as durable (i.e., by tail store server 320) may be stored in-memory, while some is stored in the filesystem. Stream store server 330 may therefore service scans based on the data located in either storage.

A situation may be encountered in which the determination at S630 continues to be negative due to a hole in the sequence of LSNs stored within the local buffer. Holes may occur because the application writing to the log crashed and did not recover, or because of a slow writing (e.g., in the case of a large payload). Scanners are typically prevented from scanning a range including a hole, in order to avoid providing the reader with an incorrect transaction history. In order to make progress despite the existence of holes, S630 may include a determination that a hole exists (e.g., based on a period of time during which the gap in LSNs has existed) and, as a result, the missing LSN may be added to the local buffer, in LSN-order, without any associated data.

Figure 7:
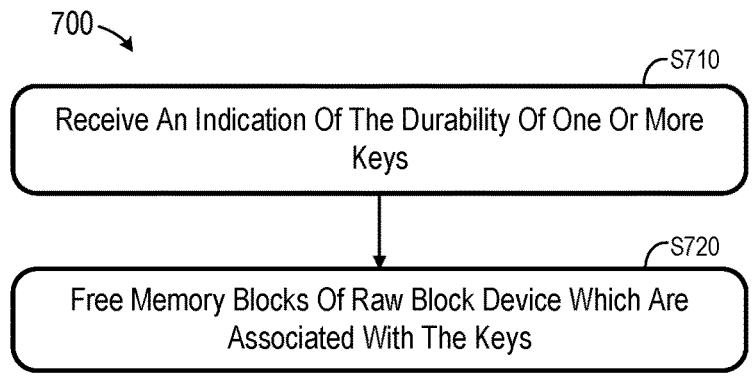
FIG. 7 is a flow diagram of a process according to some embodiments.

FIG. 7 illustrates process 700 which may be performed by tail store server 320 according to some embodiments. Server 320 receives an indication of the durability of one or more keys at S710, such as the indication transmitted by stream store server at S650. In response, tail store server 320 frees memory blocks of raw block device 325 which are associated with the one or more keys. Raw block device 325 therefore effectively acts a persistent write-buffer to ensure that data is durable until receiving an indication associated with that data at S710. According to some embodiments, freeing a memory block of raw block device 325 simply requires changing a pointer of file metadata 550 (in a case that the freed blocks are at the beginning of file 560) or a pointer to a next block within one of the file blocks (in a case that the freed blocks do not include the first block of the file).

Some embodiments facilitate recovery in case of a crash, power outage or other failure. With respect to tail store server 320 and raw block device 325, recovery may include reading the superblock to extract the partition map. For each partition, the directory block is recovered by choosing the directory block with the highest version. For each file described in the partition, the initial metadata is read from the recovered directory block. Each file is recovered by parsing out the record headers and payloads from the current block.

When the end of a block is reached, the next block is loaded by following the next pointer stored in the block header. If the sequence number of the next page doesn't match, recovery is stopped because the end of the file has been reached. Any partial record is discarded and the generation number is set to the maximum found generation number plus 1. If the CRC doesn't match, recovery is stopped because the log is corrupted. If the generation number is less than the generation number on the previous extent, recovery is also stopped due to a corrupted log. An extent is formed by adding the starting page to the number of pages required to hold the amount of data and the extent is reserved. If this extent is unable to be reserved, recovery is stopped because the log is corrupted. If the generation number is greater than the generation number on the previous extent, any partial record is discarded. Recovery of stream store server 330 and filesystem storage 335 includes scanning all the stream directories to determine which streams are persisted. For each persisted stream, the associated stream directory is scanned to determine which segments are durable. Any unfinished tail segments are discarded and will be transferred from tail store server 320 later. The recovery procedure also initializes global metadata such as the set of durable LSNs and the amount of free filesystem space.

Figure 9:
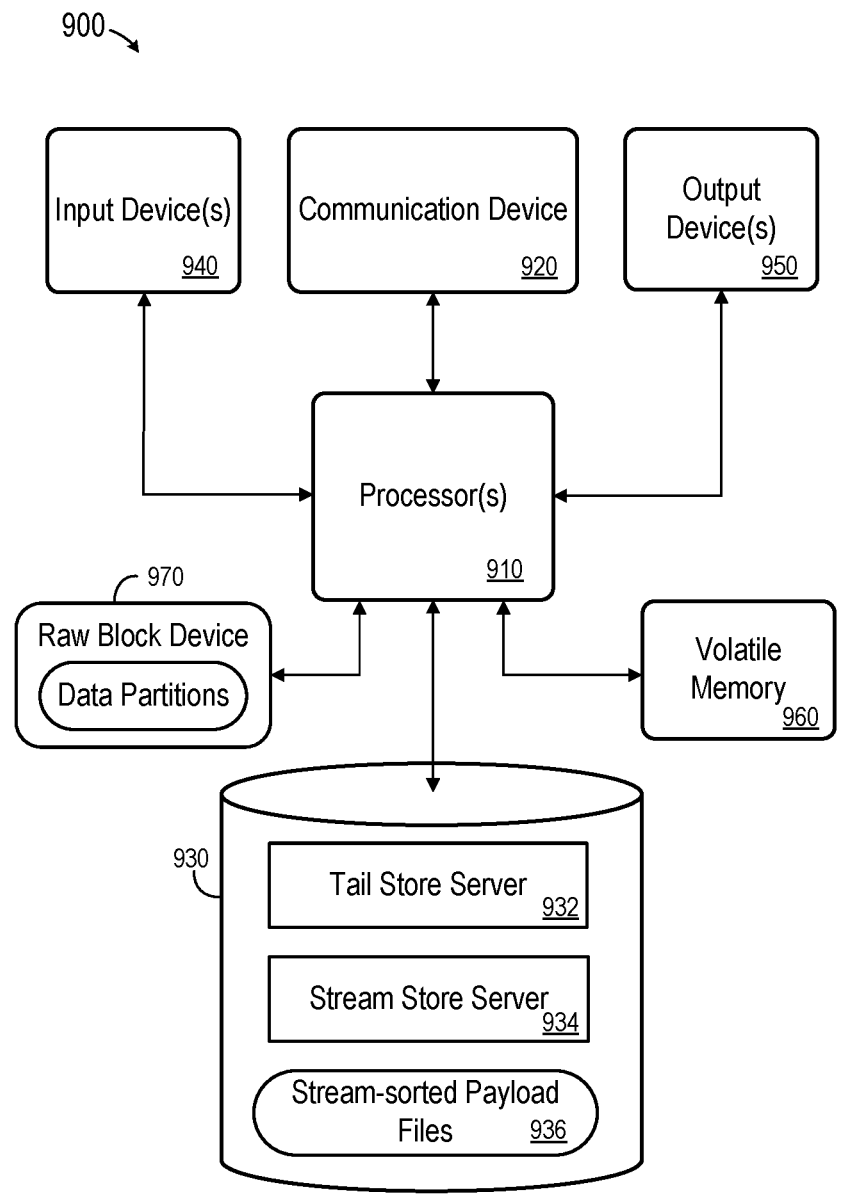
FIG. 9 is a block diagram of a system according to some embodiments.

FIG. 9 is a block diagram of system 900 according to some embodiments. System 900 may comprise a general-purpose computing apparatus and may execute program code to perform any of the functions described herein. System 900 may comprise an implementation of a storage unit of FIG. 1. System 900 may include other unshown elements according to some embodiments.

System 900 includes processor(s) 910 operatively coupled to communication device 920, data storage device 930, one or more input devices 940, one or more output devices 950, volatile memory 960 and raw block device 970. Communication device 920 may facilitate communication with an external network, and thereby with client devices and management devices. Input device(s) 940 may comprise, for example, a keyboard, a keypad, a mouse or other pointing device, a microphone, knob or a switch, an infrared (IR) port, a docking station, and/or a touch screen. Input device(s) 940 may be used, for example, to enter information into system 900. Output device(s) 950 may comprise, for example, a display (e.g., a display screen) a speaker, and/or a printer.

Volatile memory 960 may comprise Random Access Memory (RAM), Storage Class Memory (SCM) or any other fast-access memory. Memory 960 may include local buffers operating as described herein.

Raw block device 970 may comprise a memory device capable of storing raw block data without a filesystem as described herein. Data storage device 930 may comprise any appropriate filesystem-managed persistent storage device, including combinations of magnetic storage devices (e.g., magnetic tape, hard disk drives and flash memory), optical storage devices, Read Only Memory (ROM) devices, etc.

Tail store server 932 and stream store server 934 may comprise program code executed by processor(s) 910 to cause system 900 to perform any one or more of the processes described herein. Embodiments are not limited to execution of these processes by a single apparatus. Stream-sorted payload files 936 may comprise a persisted directory structure and files as described with respect to FIG. 8. Data storage device 930 may also store data and other program code for providing additional functionality and/or which are necessary for operation of system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a volatile memory;
   a raw block non-volatile memory device;
   a filesystem storage device; and
   one or more processors to execute processor-executable process steps to cause the system to execute a tail store server and a stream store server, the tail store server to:
receive a first write request from a client including a first log-sequence number and a first plurality of pairs associated with the first log-sequence number, each of the first plurality of pairs associated with a respective payload and stream identifier;
receive a second write request from the client including a second log-sequence number and a second plurality of pairs associated with the second log-sequence number, each of the second plurality of pairs associated with a respective payload and stream identifier;
copy the first log-sequence number the first plurality of pairs, the second log-sequence number and the second plurality of pairs to a first buffer of the volatile memory;
store data of the first buffer in one or more blocks of the raw block non-volatile memory device without using a filesystem; and
provide the first buffer to the stream store server,
the stream store server to:
receive the first buffer from the tail store server;
add the first log-sequence number, the first plurality of pairs, the second log-sequence number and the second plurality of pairs to a second buffer of the volatile memory;
determine that all log-sequence numbers of the second buffer span a contiguous numerical range;
in response to the determination that all log-sequence numbers of the second buffer a span a contiguous numerical range, generate a plurality of segments, where each segment comprises payloads of the second buffer associated with a single respective stream identifier and log-sequence numbers within the contiguous numerical range; and
store each segment in one or more respective filesystem files in the filesystem storage device.

2. A system according to claim 1, the tail store server further to:
free the one or more blocks of the raw block non-volatile memory device in response to the indication of the durability transmitted by the stream store server.

3. A system according to claim 1, wherein storage of the data of the first buffer in the one or more blocks of the raw block memory device comprises storage of the data in a file within one or more blocks of a partition of the raw block memory device,
wherein a header of each of the one or more blocks includes a pointer to a first page of a next one of the one or more blocks.

4. A system according to claim 3, wherein the header of each of the one or more blocks includes the first log-sequence number.

5. A system according to claim 3, wherein storage of the data of the first buffer in one or more blocks of the raw block non-volatile memory device comprises:
determination of a pointer to a first page of a last block of the one or more blocks;
storage, at the first page of the last block of the one or more blocks, of a new last block, the new last block comprising a header including a pointer to a first page of a next block; and
storage of the data within the new last block.

6. A system according to claim 1, wherein storage of each segment in one or more respective filesystem files in the filesystem storage device comprises:
addition of a third log-sequence number and third plurality of pairs to the second buffer of the volatile memory;
determination that the second log-sequence number and the third log-sequence number are separated by a missing log-sequence number; and
in response to the determination that the second log-sequence number and the third log-sequence number are separated by a missing log-sequence number, addition of the missing log-sequence number to the second buffer, in numerical order, and storage of the data of the second buffer in the filesystem storage device.

7. A system according to claim 1, wherein storage of the data of the local buffer in the filesystem storage device comprises:
storage of the data associated with a stream in a subdirectory associated with the first log-sequence number, the sub-directory stored within a directory associated with the stream identifier.

8. A method comprising:
receiving, by a tail store server, a first write request from a client including a first log-sequence number and a first plurality of pairs associated with the first log-sequence number, each of the first plurality of pairs associated with a respective payload and stream identifier;
receiving, by the tail store server, a second write request from the client including a second log-sequence number and a second plurality of pairs associated with the second log-sequence number, each of the second plurality of pairs associated with a respective payload and stream identifier;
copying the first log-sequence number, the first plurality of pairs, the second log-sequence number and the second plurality of pairs to a first buffer of a volatile memory;
storing data of the first buffer in one or more blocks of a raw block non-volatile memory device without using a filesystem;
providing the first buffer to a stream store server;
receiving the first buffer at the stream store server;
adding the first log-sequence number, the first plurality of pairs, the second log-sequence number and the second plurality of pairs to a second buffer of the volatile memory;
determining that all log-sequence numbers of the second buffer span a contiguous numerical range;
in response to determining that all log-sequence numbers of the second buffer a span a contiguous numerical range, generating a plurality of segments, where each segment comprises payloads of the second buffer associated with a single respective stream identifier and log-sequence numbers within the contiguous numerical range; and
storing each segment in one or more respective filesystem files in a filesystem storage device.

9. A method according to claim 8, further comprising:
freeing the one or more blocks of the raw block non-volatile memory device in response to the indication of the durability transmitted by the stream store server.

10. A method according to claim 8, wherein storing the data of the first buffer in the one or more blocks of the raw block memory device comprises storing the data in a file within one or more blocks of a partition of the raw block memory device,
wherein a header of each of the one or more blocks includes a pointer to a first page of a next one of the one or more blocks.

11. A method according to claim 10, wherein the header of each of the one or more blocks includes the first log sequence number.

12. A method according to claim 10, wherein storing the data of the first buffer in one or more blocks of the raw block non-volatile memory device comprises:
   determining a pointer to a first page of a last block of the one or more blocks;
   storing, at the first page of the last block of the one or more blocks, of a new last block, the new last block comprising a header including a pointer to a first page of a next block; and
   storing of the data within the new last block.

13. A method according to claim 8, wherein storing each segment in one or more respective filesystem files in the filesystem storage device comprises:
   adding a third log-sequence number and third plurality of pairs to the second buffer of the volatile memory;
   determining that the second log-sequence number and the third log-sequence number are separated by a missing log-sequence number; and
   in response to the determining that second log-sequence number and the third log-sequence number are separated by a missing log-sequence number, adding the missing log-sequence number to the second buffer, in numerical order, and storing the data of the second buffer in the filesystem storage device.

14. A method according to claim 8, wherein storing of the data of the local buffer in the filesystem storage device comprises:
   storing of the data associated with a stream in a subdirectory associated with the first log-sequence number, the sub-directory stored within a directory associated with the stream identifier.

15. A non-transitory computer-readable medium storing processor-executable process steps to cause a computing system:
   receive, by a tail store server, a first write request from a client including a first log-sequence number and a first plurality of pairs associated with the first log-sequence number, each of the first plurality of pairs associated with a respective payload and stream identifier;
   receive, by the tail store server, a second write request from the client including a second log-sequence number and a second plurality of pairs associated with the second log-sequence number, each of the second plurality of pairs associated with a respective payload and stream identifier;
   copy the first log-sequence number, the first plurality of pairs, the second log-sequence number and the second plurality of pairs to a first buffer of a volatile memory;
   store data of the first buffer in one or more blocks of a raw block non-volatile memory device without using a filesystem;
   provide the first buffer to a stream store server;
   receive the first buffer at the stream store server;
   add the first log-sequence number, the first plurality of pairs, the second log-sequence number and the second plurality of pairs to a second buffer of the volatile memory;
   determine that all log-sequence numbers of the second buffer span a contiguous numerical range;
   in response to the determination that that all log-sequence numbers of the second buffer a span a contiguous numerical range, generate a plurality of segments, where each segment comprises payloads of the second buffer associated with a single respective stream identifier and log-sequence numbers within the contiguous numerical range; and
   store each segment in one or more respective filesystem files in a filesystem storage device.

16. A medium according to claim 15, the processor-executable process steps to further cause a computing system to:
   free the one or more blocks of the raw block non-volatile memory device in response to the indication of the durability transmitted by the stream store server.

17. A medium according to claim 15, wherein storage of the data of the first buffer in the one or more blocks of the raw block memory device comprises storage of the data in a file within one or more blocks of a partition of the raw block memory device,
   wherein a header of each of the one or more blocks includes a pointer to a first page of a next one of the one or more blocks and,
   wherein storage of the data of the first buffer in one or more blocks of the raw block non-volatile memory device comprises:
   determination of a pointer to a first page of a last block of the one or more blocks;
   storage, at the first page of the last block of the one or more blocks, of a new last block, the new last block comprising a header including a pointer to a first page of a next block; and
   storage of the data within the new last block.

18. A medium according to claim 15, wherein storage of each segment in one or more respective filesystem files in the filesystem storage device comprises:
   addition of a third log-sequence number and third plurality of pairs to the second buffer of the volatile memory;
   determination that the second log-sequence number and the third log-sequence number are separated by a missing log-sequence number; and
   in response to the determination that the second log-sequence number and the third log-sequence number are separated by a missing log-sequence number, addition of the missing log-sequence number to the second buffer, in numerical order, and storage of the data of the second buffer in the filesystem storage device.

* * * * *